(No Model.)

A. J. OWENS.
INSECT DESTROYER.

No. 389,482. Patented Sept. 11, 1888.

Witnesses
E. C. Duffy
H. E. Peck

Inventor
Andrew J. Owens
By his Attorney
E. C. Duffy

UNITED STATES PATENT OFFICE.

ANDREW J. OWENS, OF RUSHVILLE, INDIANA.

INSECT-DESTROYER.

SPECIFICATION forming part of Letters Patent No. 389,482, dated September 11, 1888.

Application filed March 8, 1888. Serial No. 266,576. (No model.)

*To all whom it may concern:*

Be it known that I, ANDREW J. OWENS, of Rushville, in the county of Rush and State of Indiana, have invented certain new and useful Improvements in Insect-Destroyers; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to an improvement in those insect destroyers in which a light is employed to attract the insects, said light being placed in close proximity to a reservoir containing a suitable fluid for the destruction of the insects.

The object of my invention is to provide an improved device which shall readily and effectually exterminate insects and prevent their destructive influence on the vegetable kingdom, and which is especially for use in gardens, orchards, or grain-fields, said device being located, preferably, near the ground when the vegetables head close to the earth, or when used in grain-fields the destroyer is placed near the horizontal plane of the head of the grain, and when placing the destroyer the state of the atmosphere should be taken into consideration, for when the wind is high the insects fly low, and when it is calm the insects fly on a higher plane.

With these ends in view, my invention consists in certain novel features of construction and combinations of parts more fully described hereinafter, and particularly pointed out in the claims.

Figure 1:
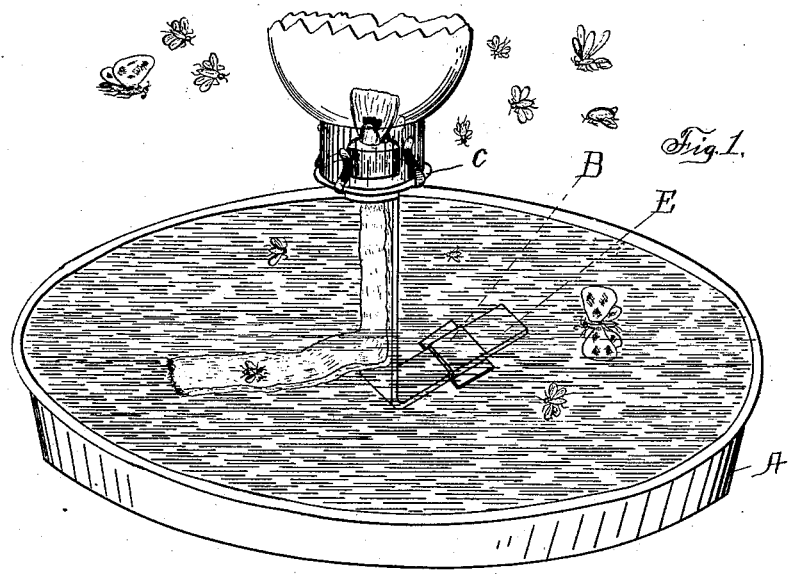
Figure 2:
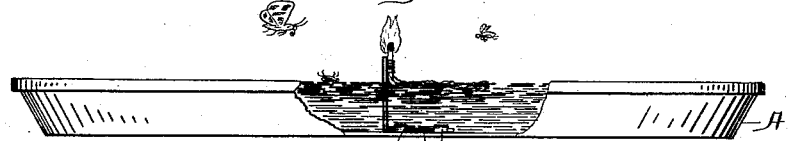
Figure 3:
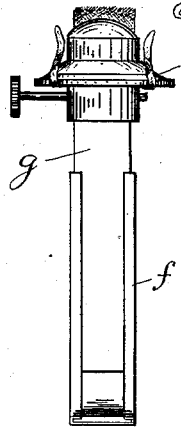

Referring to the accompanying drawings, Figure 1 is a perspective view of my complete device. Fig. 2 is a side elevation of the same, a portion of the reservoir being broken away. Fig. 3 is an elevation of the telescopic or adjustable standard and the burner carried by the same, and Fig. 4 is a perspective view of a blank from which the standard and burner can be formed.

In the drawings, the reference-letter A indicates a suitable reservoir or pan, preferably being somewhat shallow and provided with a flat or plain bottom, so that the reservoir will remain steady when placed in position. Upon the bottom of the reservoir a loop or strap, B, is secured, so that the open portion of the loop will extend in a radial line from the center of the reservoir, and said reservoir is adapted to be filled with kerosene, coal-oil, or any other suitable inflammable fluid, or of oil and water. A burner, C, is adjustably mounted upon a standard, D, which is bent laterally or provided at its lower portion with a laterally-extending arm, E, like an angle-iron, adapted to be removably confined within the loop B when the burner is in position. The burner, if desired, can be provided with a suitable chimney, as shown, and its wick extends downward and freely floats in the oil or other fluid in the reservoir, thus supplying the fuel for the flame from the same substance and reservoir into which the insects fall. The standard which supports the burner is preferably constructed in two parts or sections. The lower section, $f$, is stamped or otherwise formed from flat metal, and is provided with the lateral arm, which extends from the upright portion at right angles, and the edges of said lower section are bent over and doubled back, so as to strengthen the section, and to provide guide-grooves in the upright portion of the section to receive the straight flat upper section, $g$, of the standard, and which carries the wick or burner, and is confined in the groove formed by the turned-over edges of the lower section, and is thus rendered vertically adjustable, as the sections $g$ fit in the grooves tightly enough to be held in any vertical adjustment by friction only.

Figure 4:
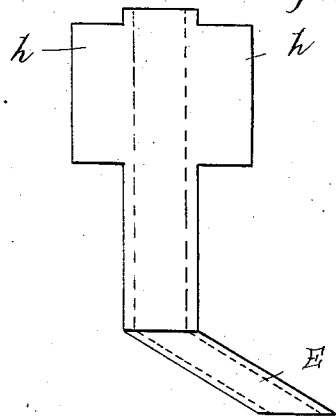

In Fig. 4 a blank is shown from which the standard and burner are made. This blank is struck up from sheet metal, and is provided with the flaps or wings $h\ h$, which can be turned inwardly toward each other, and thus hold the wick and dispense with the expensive burner commonly used, as clearly shown in Fig. 2. It is obvious to those acquainted with the art that the herein-described device after being lighted and placed in the desired position will attract the insects, and that they will fly toward the light and fall into the oil, which will render them incapable of escaping.

When the oil and water are used, the water will go to the bottom and the oil will remain on top, the wick floating with the oil on the top.

The blank from which the standard and burner can be constructed, and as herein shown and described, is not claimed in the present application, but will form the subject-matter of an application to be filed by me in the future.

It is clearly evident that the extreme simplicity and cheapness of my device will recommend it to farmers, market-gardeners, and others, and its effectiveness will free them of the great numbers of insects, which are now increasing in numbers and threatening to completely destroy all garden vegetables. It is also obvious that the oil designed for disabling the insect to fly is utilized to supply the burner. Otherwise when it becomes thick with insects it would have to be thrown away and thus wasted, for it could not afterward be used in lamps. It is also evident that slight changes might be resorted to in the form and arrangement of the parts described without departing from the spirit and scope of my invention; hence I do not wish to limit myself strictly to the precise construction herein set forth.

What I claim is—

1. In an insect-destroyer, the combination, with a reservoir adapted to contain a fluid to supply fuel for a flame, of a standard removably secured in the reservoir, and a wick carried by the same and adapted to float in the fluid in the reservoir, substantially as described.

2. The herein-described insect-destroyer, consisting of the reservoir and the standard provided with a laterally-extending arm adapted to be secured to the bottom of the reservoir, and a wick carried by the upper portion of the standard and adapted to extend into the reservoir, substantially as described.

3. In an insect-destroyer, the combination, with a reservoir provided with a loop or strap upon its bottom, of a standard provided with a laterally-extending arm to be removably held by said loop, and a wick carried by the upper portion of the standard, substantially as described.

4. In an insect-destroyer, the combination, with the reservoir provided with the loop, of the standard provided with the lateral arm held by the loop, and a vertically adjustable burner carried by the upper portion of the standard, substantially as described.

In testimony that I claim the foregoing as my own I affix my signature in presence of two witnesses.

ANDREW J. OWENS.

Witnesses:
CHAS. M. WERLÉ,
HUBERT E. PECK.